United States Patent
Mikhaylovich

(10) Patent No.: US 11,350,552 B2
(45) Date of Patent: Jun. 7, 2022

(54) CULTIVATOR

(71) Applicant: Shuravko Vladimir Mikhaylovich, Moscow (RU)

(72) Inventor: Shuravko Vladimir Mikhaylovich, Moscow (RU)

( * ) Notice: Subject to any disclaimer, the term of this patent is extended or adjusted under 35 U.S.C. 154(b) by 0 days.

(21) Appl. No.: 16/869,598

(22) Filed: May 8, 2020

(65) Prior Publication Data
US 2021/0000001 A1 Jan. 7, 2021

(51) Int. Cl.
*A01B 1/06* (2006.01)

(52) U.S. Cl.
CPC ...................... *A01B 1/06* (2013.01)

(58) Field of Classification Search
CPC ............... A01B 1/06; A01B 1/14; A01B 1/16
USPC .......................................... 172/378
See application file for complete search history.

(56) References Cited

U.S. PATENT DOCUMENTS

| | | | | |
|---|---|---|---|---|
| 2,082,476 A | * | 6/1937 | Allen | A01G 20/30 172/25 |
| 2,748,683 A | * | 6/1956 | Baird | A01B 1/14 172/350 |
| 4,905,768 A | * | 3/1990 | Lorenz | A01B 1/14 172/25 |
| 5,207,466 A | * | 5/1993 | Ohlson | A01B 1/14 172/21 |
| 2009/0255696 A1 | * | 10/2009 | Ortiz | A01B 1/065 172/41 |

* cited by examiner

*Primary Examiner* — Tara Mayo-Pinnock
(74) *Attorney, Agent, or Firm* — Michael D. Eisenberg

(57) ABSTRACT

The invention relates to agricultural manual implements with teeth, particularly to operating elements of hand cultivators.

The operating element 2 of the cultivator 1 contains distributed spiral teeth 3, forming an open circular profile 4 in the plan. The spiral teeth 3 are connected in the upper part to each other in the shape of a regular polygon 5, while the pointed part 6 of the spiral tooth 3 smoothly passes into its remaining cylindrical part 7. The tilt angle of the spiral teeth 3 to the horizon is $\beta=25\text{-}45°$, the sharpening angle of the teeth is $\alpha=20\text{-}40°$, the angle of rotation of the full penetration of the tooth 3 is $\gamma=40\text{-}120°$, and the thickness of the cutting edge 7 of the spiral tooth 3 is $h=1\text{-}3$ mm. The invention allows to reduce the fatigue of human muscles during loosening due to easy penetration of the operating element 2 of the cultivator 1 into the soil when it is installed on the soil at the angle $\delta=60\text{-}90°$ to the horizon while minimizing premature soil subsidence, eliminating the need to repeat cultivation of the same plot.

4 Claims, 3 Drawing Sheets

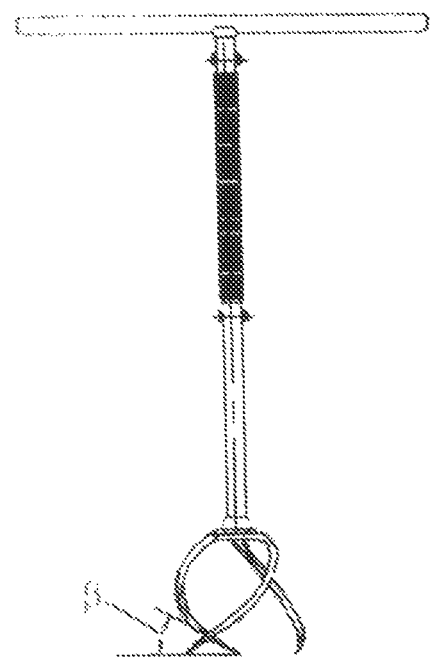
fig. 1
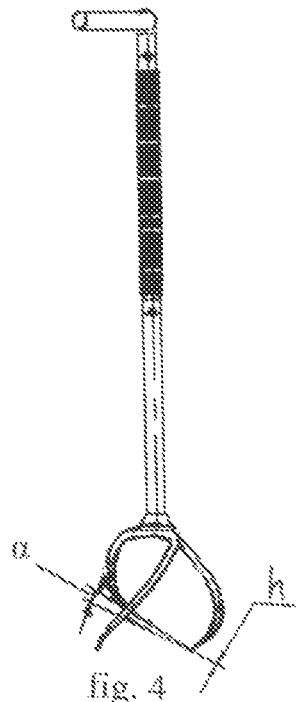
fig. 4
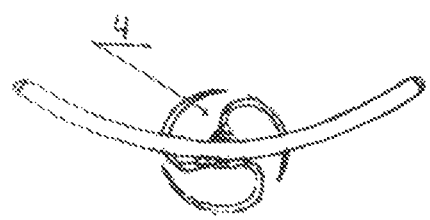
fig. 2
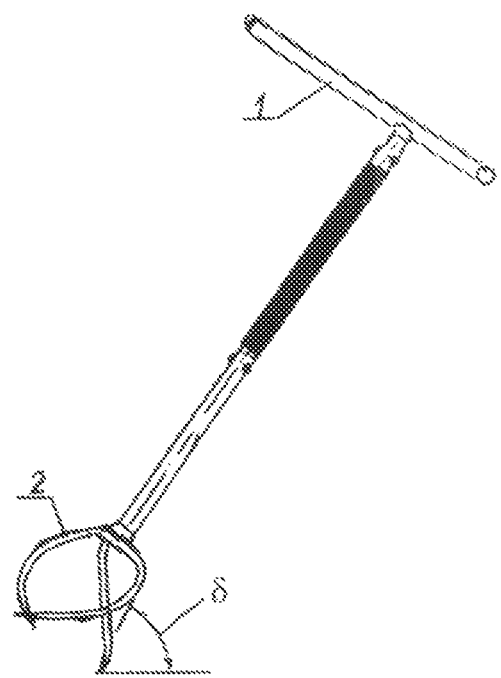
fig. 3
fig. 5

CULTIVATOR

CROSS-REFERENCES TO RELATED APPLICATIONS

This application claims priority from Russian Application Serial Number 2019121417 filed Jul. 5, 2019, which is hereby incorporated herein by reference in the respective in its entirety.

TECHNICAL FIELD

The invention relates to agricultural manual implements with teeth, particularly to operating elements of hand cultivators.

BACKGROUND OF THE INVENTION

There is a prior art hand cultivator (patent RU 85287 U1, published on Aug. 10, 2009) that has an operating element with spiral teeth, which in a plan form a closed profile, while the teeth intersect with each other. This solution is aimed at creating a simple design of a hand cultivator, more technological in manufacturing, mobile in assembly and readjustment, that is, functionally reliable and universal.

The aforementioned cultivator has a disadvantage: the need to press on the tool with your foot when deepening it into the soil.

There is also a prior art cultivator (patent RU 120311 U1, published on Sep. 20, 2012), containing an operating element with curved pointed teeth oriented in the direction of movement of soil loosening and connected at the top to each other in the form of a contour frame with equal sides. Such solution is aimed at reducing the fatigue of human muscles during soil loosening due to easy penetration of the operating element of the cultivator into the soil, which is determined by its special geometry, strength and sharpness of teeth.

The disadvantage of such cultivator is premature eruption of the soil from the operating element when the cultivator is removed from the soil due to insufficient coverage of soil area with the teeth, which, in its turn, leads to the need for repeated cultivation of the soil and, consequently, increases fatigue of the human muscles due to such repeated operation.

There is also a prior art hand cultivator (patent RU 2153787 C1, published on Aug. 10, 2000) with an operating element in the shape of pointed and spatially-arranged spiral-shaped paired teeth of different radii, which are paired, parallel-directed spirals of different radii, directed clockwise. The cultivator is as well equipped with a rotary handle with a vertical shaft, to which the specified operating element is attached. When using the hand cultivator to remove weeds, their roots are cut and cling to spatially-arranged spiral teeth and then are easily removed from the soil. Such technical solution of the tool reduces human fatigue due to the work of various muscle groups during the process of soil loosening, which increases productivity and ease of use.

The disadvantage of this hand cultivator is the need to overcome the high soil resistance when deepening the operating element into it with subsequent rotation of the pointed spatially-arranged spiral-shaped paired teeth of different radii.

BRIEF SUMMARY OF EMBODIMENTS OF THE INVENTION

The objective of the invention is to eliminate the aforementioned disadvantages and reduce efforts when loosening the soil.

The technical result of the invention is the reduction of human fatigue when using a cultivator by facilitating efforts to deepen the operating element into the soil. The technical result is as well the minimization of premature soil subsidence, which eliminates the need to repeat cultivation of the same piece of land.

The technical result is achieved in that the cultivator has an operating element with distributed spiral teeth forming an open circular profile in the plan, and in the upper part they are connected to each other in the shape of a regular polygon, according to the invention, the spiral teeth are made with a sharpening angle of 20°-40°, tilt angle to the horizon 25°-45° and the possibility of rotation of the tooth full penetration in the range of 40°-120°.

The spiral tooth has a pointed part smoothly passing into its cylindrical part.

The spiral tooth is made with the cutting edge thickness of 1-3 mm.

The operating element is made with the possibility of installation on the soil at the angle of 60°-90° to the horizon.

BRIEF DESCRIPTION OF THE DRAWINGS

FIGS. 1-15 present examples of the invention implementation with an operating element containing different number of spiral teeth.

FIG. 1 presents the operating element with three teeth, which shows the tilt angle of the teeth to the horizon.

FIG. 2 presents the top view of the operating element which illustrates that the teeth form a circular profile.

FIG. 3 presents the bottom view of the operating element which illustrates the connection of the teeth in the upper part with each other in the shape of a regular triangle, as well as the angle of rotation of the tooth full penetration.

FIG. 4 presents the operating element and illustrates the angle of sharpening and the thickness of the teeth cutting edge.

FIG. 5 presents the cultivator with a handle and shows the angle of installation of the operating element on the soil.

FIGS. 6-10 present the cultivator with the operating element with four teeth.

FIGS. 11-15 present the cultivator with the operating element with five teeth.

DETAILED DESCRIPTION OF THE EMBODIMENTS OF THE INVENTION

Figure 6:
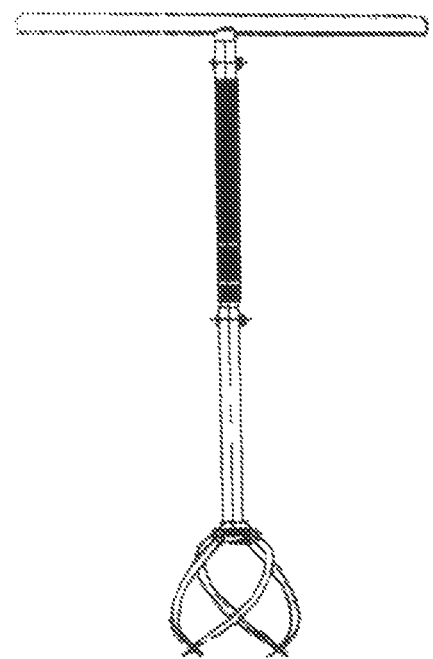

The cultivator 1 includes an operating element 2 with spiral teeth 3 with an open circular profile 4 connected in the upper part in the shape of a regular polygon 5.

The operating element 2 of the cultivator 1 is made by forging or precise forging methods. The spiral teeth 3 are made in the pointed part 6 with a sharpening angle $\alpha=20°-40°$, a tilt angle to the horizon $\beta=25°-45°$, and with the possibility of rotation of the full penetration of the tooth 3 in the interval $\gamma=40°-120°$. The thickness h of the cutting edge 7 of the spiral tooth 3 is equal to 1-3 mm. The operating element 2 of the cultivator 1 can be installed on various types of vertical poles 8, including telescopic, and those having straight, curved, or S-shaped handles 9.

The cultivator 1 with the aforementioned operating element 2 works as follows.

The operating element 2 of the cultivator 1 is installed on the soil surface at the angle of 60-90°. The pole 8 is turned with the handle 9 and the operating element 2 is immersed in the soil until the spiral teeth 3 get into the soil, then the cultivator is removed from the soil, the cultivator 1 is moved to the side and the cycle is repeated. The possibility to install the operating element 2 of the cultivator 1 at the angle of 60-90° allows to use it on uneven soil surfaces, including mountainous surfaces, slopes, where it is not possible to install the cultivator 1 exactly vertically (90°). Such angle of 60°-90° also allows to process very hard soil, since the combination of the aforementioned design features of the operating element 2 ensures the efficient operation of the cultivator 1 and is confirmed by the cause-and-effect relation between the design features of the operating element 2 of the cultivator 1 and the data on fatigue of the user's muscles which are presented in relation to the need to overcome the soil resistance when cultivating it with the cultivator 1 and are correlated in the Table below where the teeth 3 tilt angles to the horizon are 25°-45°, the sharpening angle is 20°-40° in the pointed part 6, the angle of rotation of the full penetration of the spiral tooth 3 is $\gamma=40°-120°$ and the thickness of the cutting edge 7 of the spiral tooth 3 is h=1-3, as well as the smooth transition of the pointed part 6 of the spiral tooth 3 into its remaining cylindrical part 7, and are associated with the technical result, which lies in reducing the fatigue of human muscles when loosening the soil.

| Cultivator operating element parameter | Parameter value | User's muscle fatigue indicator |
|---|---|---|
| Teeth angle to the horizon | >25° | Low soil resistance, while a large rotation angle of the operating element is required for the full penetration of the teeth into the soil, i.e. it is necessary to make more effort to turn the handle of the cultivator, sometimes the user has to change the position of hands: the soil loosens strongly along the closed tooth profile and its premature eruption occurs when shaking the cultivator. |
| | 25-45° with the pitch of 1° | Weak soil resistance when deepening the operating element into the soil, the rotation of the teeth does not require a change in the position of the user's hands, which reduces the load on the user's muscles: the soil with roots clenched in the spiral of teeth is easily detached and mostly remains there when the cultivator's operating element is removed from the soil. |
| | <45° | Strong soil resistance when deepening the operating element into the soil and at a small rotation angle, which requires a lot of effort from the user's muscles: a part of the soil, clenched in the spiral of teeth is not detached when turning, which requires additional efforts to separate it when shaking the cultivator. |
| Teeth sharpening angle | >20° | When the cultivator is deepened, the weeds and roots of plants string and cling to the teeth, which requires more effort to overcome the soil resistance. |
| | 20-40° with the pitch of 1° | When the cultivator is deepened, the weeds and roots of plants do not cling to the teeth, but get inside the spiral of teeth with the soil or get cut from this spiral. |
| | <40° | When the cultivator is deepened, there is a high soil resistance due to the low ability of the teeth of the operating element to penetrate into it, which requires more effort from the user. |
| Angle of rotation of the tooth full penetration | >40° | The full penetration of the teeth into the soil is not ensured, which requires repeated cultivation. |
| | 40-120° | The full penetration of the teeth into the soil is ensured and no change in the position of the user's hands is required. |
| | <120° | Frequent change of position of the user's hands with further rotation of the operating element of the cultivator is needed, so more effort is required from the user. |
| | >1 mm | When the operating element is deepened, roots of plants and weeds string and cling to the teeth, which requires more effort to overcome the soil resistance. |
| Tooth cutting edge thickness | 1-3 mm with the pitch of 0.5 mm | When the operating element is deepened in the soil, roots of plants and weeds do not cling to the teeth and do not abut against them, so less effort is required from the user. |
| | >3 mm | When the operating element is deepened, roots of plants and weeds do not string onto the teeth, but abut against them and additional effort is required to overcome the resistance. |
| | smooth transition of the pointed part of the tooth into its cylindrical part | When the operating element is deepened in the soil, roots of plants and weeds do not cling to the teeth, but get inside the spiral of teeth with the soil. |

Figure 9:
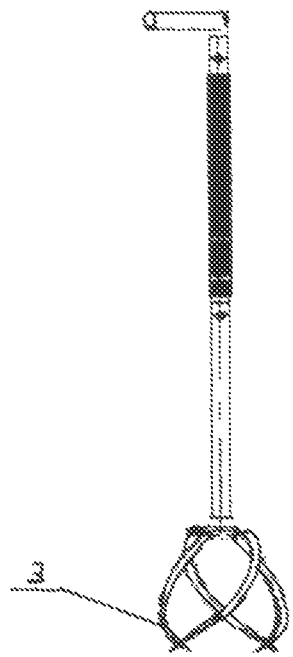
Figure 7:
Figure 8:
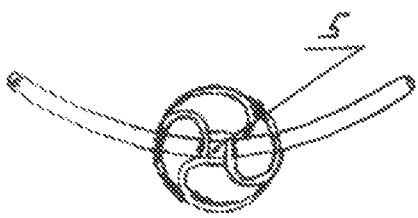
Figure 10:
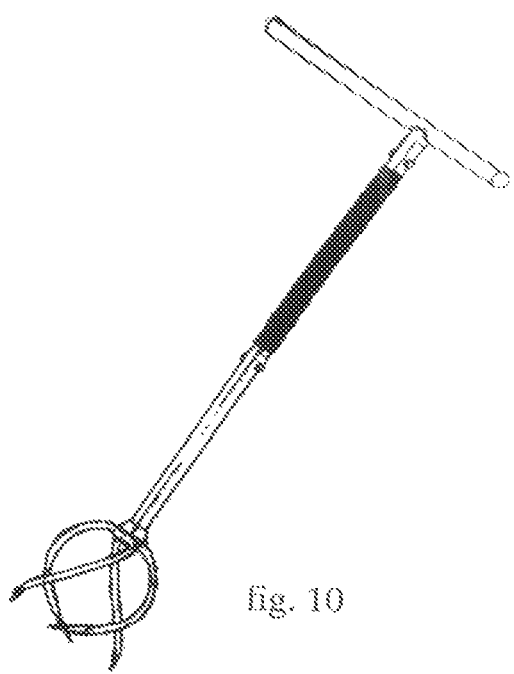
Figure 11:
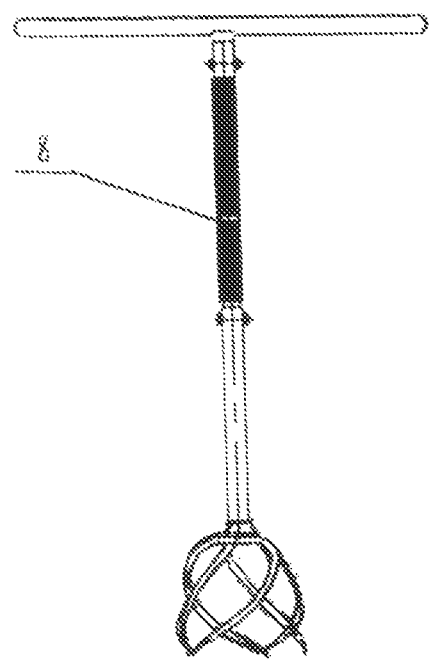
Figure 14:
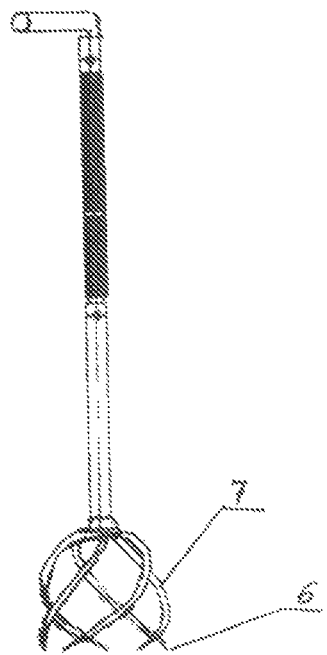
Figure 12:
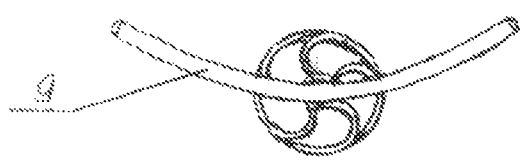
Figure 13:
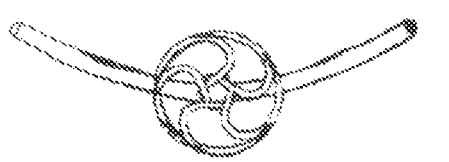
Figure 15:
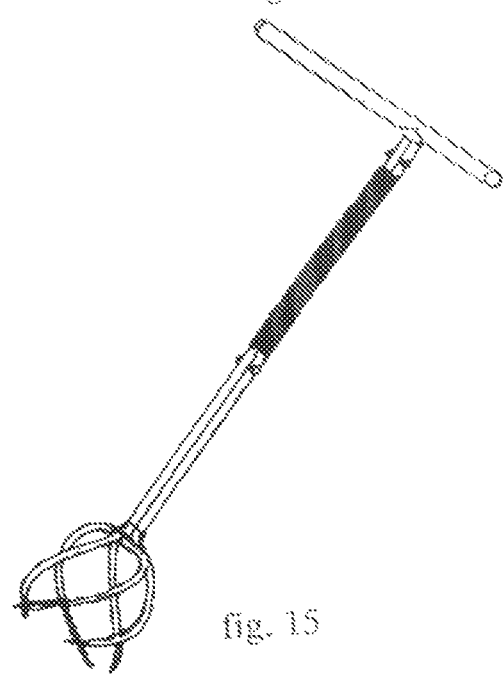

The data in the Table were obtained as a result of numerous tests of cultivator 1, with various operating elements 2 (see FIG. 1-15) in the field during the work on soil ridging performed by age groups of users from 12 to 70 years old on their garden plots.

It should be noted that for a specialist it is obvious that the invention can be implemented with an operating element 2 with a different number of spiral teeth 3 (see FIG. 1-15), while the operating element 2 can be installed on various types of vertical poles 8, including telescopic, and those having straight, curved, or S-shaped handles 9.

The invention claimed is:
1. A cultivator containing an operating element with distributed spiral teeth forming an open circular profile in a plan view, in an upper part and connected to each other in the shape of a regular polygon, wherein the spiral teeth are made with a pointed part with the sharpening angle $\alpha=20°-$

40°, the tilt angle to the horizon $\beta=25°-45°$ and wherein each tooth can rotate for penetration about an angle of rotation in the interval $\gamma=40°-120°$.

2. The cultivator of claim 1, wherein the spiral tooth has a pointed part smoothly passing into its cylindrical part.

3. The cultivator of claim 1, wherein the spiral tooth is made with the cutting edge of the thickness $h=1-3$ mm.

4. The cultivator of claim 1, wherein the operating element is capable of penetrating the soil at an angle of $\delta=60°-90°$ to the horizon.

* * * * *